No. 11,687.

R. CADY.

RAILWAY SWITCH.

(Application filed Apr. 27, 1898.)

Reissued Aug. 16, 1898.

Witnesses
Seth Kingman.
Geo. A. Johnson

Inventor
Richard Cady
by Townsend Bros
his attys

THE NORRIS PETERS CO., PHOTO-LITHO., WASHINGTON, D. C.

UNITED STATES PATENT OFFICE.

RICHARD CADY, OF LOS ANGELES, CALIFORNIA.

RAILWAY-SWITCH.

SPECIFICATION forming part of Reissued Letters Patent No. 11,687, dated August 16, 1898.

Original No. 588,951, dated August 31, 1897. Application for reissue filed April 27, 1898. Serial No. 679,038.

*To all whom it may concern:*

Be it known that I, RICHARD CADY, a citizen of the United States, residing at Los Angeles, in the county of Los Angeles and State of California, have invented certain new and useful Improvements in Railway-Switches, of which the following is a full and complete specification, such as will enable those skilled in the art to which it appertains to make and use the same.

This invention relates to railway-switches and to means for operating the same; and the object thereof is to provide an improved switch-operating device which is connected with a railway-track and in operative connection with the usual pivoted switch bar or tongue and which is adapted to be operated by devices connected with the platform of a car. The said switch-operating device consists in a triangularly-shaped trip-lever operatively connected with the switch-tongue and pivoted near the center to turn on a vertical axis to bring alternately one and another of its sides obliquely across a vertical plane extending parallel with the track-rails and through the pivot, and the device connected with the platform of the car for operating the trip-lever is normally yieldingly held in said vertical plane and has a limited lateral movement and is vertically movable, so that it may be depressed to be brought by the onward movement of the car into engagement with that side of the trip-lever which at that time lies across said plane, the amplitude of lateral movement of said trip-operating device being sufficient to allow said trip-operating device to pass on either side of the pivot of the trip-lever and then to be held by a suitable stop carried by the car, so that by simple engagement with the flaring rearward end of the trip-lever it will turn the trip-lever to throw the switch-tongue, means being provided to temporarily and positively hold the trip-lever in whichever position it is thrown to by the trip-operating device.

My invention includes the apparatus herein described and claimed.

The invention is fully disclosed in the following specification, of which the accompanying drawings form a part, in which—

Figure 1:
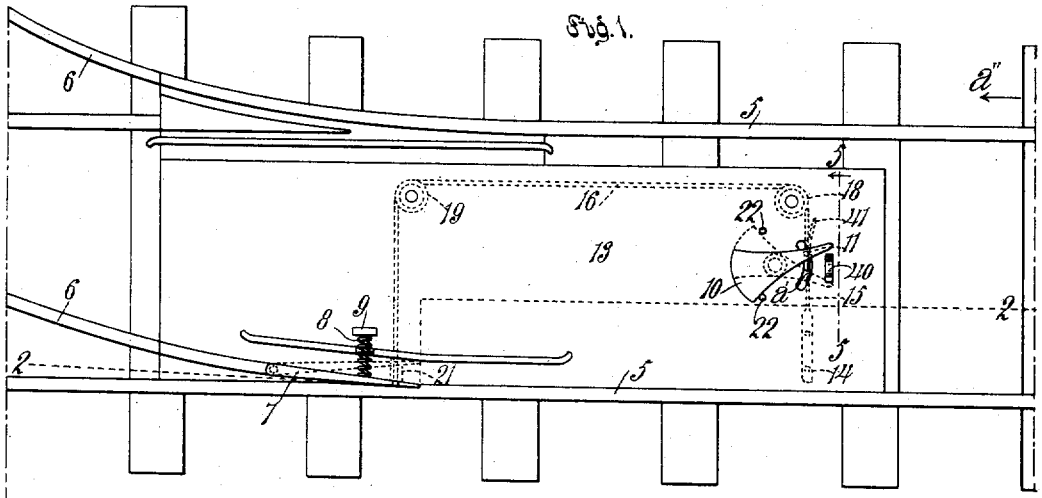
Figure 2:
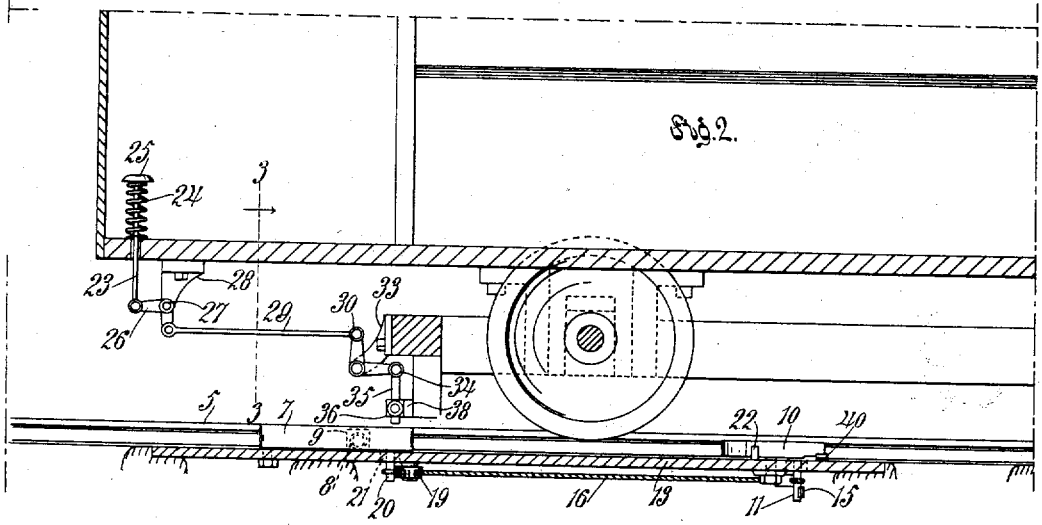
Figure 4:
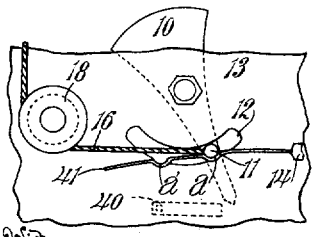
Figure 3:
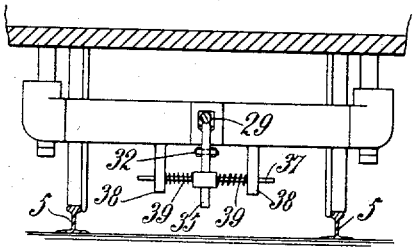
Figure 5:
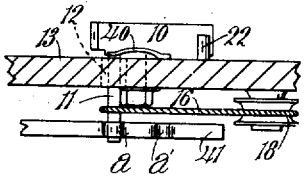

Figure 1 is a plan view of a railway-track and showing the rails of a side track or switch and the switch-operating mechanism which I employ; Fig. 2, a section on the line 2 2 of Fig. 1 and showing a car in place on the track, the car being in longitudinal mid-section and provided with the device which I employ for operating the switch. The car is shown as having thrown the switch. Fig. 3 is an end view of said car and a cross-section of the rails of the track. Fig. 4 shows the bar and spring as viewed from the under side. Fragments of the plate 13 and the trip-lever 10 are also shown. Fig. 5 is a sectional elevation on line 5 5, Fig. 1, looking in the direction of the arrow, the trip-lever being in the position indicated in dotted lines in Fig. 1.

In the drawings forming part of this specification the separate parts of my improvement are designated by the same numerals of reference in each of the views, and in said drawings, reference being made to Fig. 1, I have shown at 5 the rails of a railway-track and at 6 the rails of a side track or switch, and in the practice of my invention I employ the usual pivoted switch bar or tongue 7, the free end of which is provided with a spring 8, which presses against and is connected with a post or support 9, which is secured between the rails of the main track and which is adapted to hold the tongue or bar 7 in the closed position.

Pivotally mounted centrally of the main track and at a suitable distance from the switch bar or tongue 7 is a triangular switch-operating trip-lever 10, the longer arm of which is provided with a pin 11, which moves in a transverse segmental slot 12, formed in a plate 13, which is secured between the rails of the main track, and secured at one end of said slot is a bar 14, provided at its inner end with a spring-arm 15. Said spring-arm is provided in the side thereof adjacent to the pin 11 with transverse notches or recesses *a* *a'*, in which said pin operates, and secured to said pin 11 is a rope, cord, or chain 16, and said rope, cord, or chain is passed around a pulley 18 opposite the free end of the spring-arm 15 and around another pulley 19 opposite the free end of the switch tongue or bar 7 and is then connected with a depending pin 20, secured to the free end of said switch tongue or bar and passed downwardly through a slot 21 in the plate 13.

Arranged at each side of the end of the lever 10 opposite that with which the pin 11 is connected are pins 22, which limit the movement of said lever. I also provide a spring 40, which is secured to the plate 13 to bear against the end of the trip-lever 10 to prevent the spring 8 from closing the switch, except when the trip-lever is moved for that purpose. The recessed spring-arm 15 also aids in this operation, the recess *a* being so located that when the switch-tongue 7 is thrown into the open position shown in dotted lines in Fig. 1 the pin 11 of the trip-lever 10 will be seated in the recess *a*, and at the same time the trip-lever will engage the spring 40, and the combined action of the two springs 15 and 40 will be sufficient to hold the trip-lever until it is positively operated to close the switch. I also provide devices which are connected with the car and by which the lever 10 may be operated, said devices consisting of a vertically-movable bolt or rod 23, which passes through the platform of the car and on which is mounted, above said platform, a spring 24, and the rod or bolt 23 is provided with a head 25, and the spring 24 holds the rod 23 in a raised position.

The lower end of the rod 23 is connected with a crank-lever 26, which is pivotally connected at 27 with a hanger 28, secured to the platform of the car, and one arm of said crank-lever is also connected with a rod 29, which extends backwardly and is pivotally connected at 30 with one arm of a crank-lever 31, which is pivotally connected at 32 with a bracket or arm 33, which is connected with the truck of the car, and one arm of the crank-lever 31 is directed backwardly and pivotally connected at 34 with a vertically-movable rod 35, which passes through a keeper 36 and by which rod the lever 10 is operated.

The keeper 36, through which the vertically-movable rod 35 passes, is formed on or secured to a rod 37, which passes through two hangers 38, and between said keeper and said hangers are springs 39, and said rod 37 is free to move in the hangers 38, but cannot be detached therefrom, and the rod 35, which is connected with the crank 31, is thus capable of a slight lateral movement.

The operation will be readily understood from the foregoing description when taken in connection with the accompanying drawings and the following statement thereof.

If a car provided with the switch-operating apparatus herein described be moving on the main track in the direction of the arrow *a''* and it is desired to operate the switch, all that is necessary is to depress the rod 35 by forcing down the rod 23, which passes through the platform of the car, so that the device 35 will, by the onward movement of the car, be brought to engage the side of the lever 10, which extends across a vertical plane running parallel with the track and through the pivot of the trip-lever, as shown in Fig. 1. The sides of the trip-lever are also preferably curved, as is also shown in said figure. When the device 35 engages the side of the trip-lever, said trip-lever will first throw the device sidewise sufficiently to allow the device to pass the pivot of the trip-lever, and then the device, being stopped by the compressed spring 39, will act upon the rear flaring portion of the trip-lever to throw the same, and thereby operate the mechanism which connects it with the switch-tongue, so as to open the switch and allow the car to take the side track. The operation of the device 35 is accomplished by depressing the rod 23, which by reason of the crank-levers 26 and 31 and the rod 29 will depress the rod 35, so as to strike the side of the lever 10 and force said lever into the position shown in dotted lines in Fig. 1, and the car can take the side track. If the following car is to run along the main track, the motorneer or other person in control will depress the rod 35 and it will strike on the side of the trip-lever, and the parts operating as above described the trip-lever will be thrown into the position shown in solid lines in Fig. 1 and the spring 8 will return the switch-tongue to the closed position.

It will thus be seen that I accomplish the object of my invention by means of a device which is simple in construction and operation and which may be easily applied to any form of a railway-switch.

Having fully described my invention, I claim as new and desire to secure by Letters Patent—

1. A railway-switch comprising a switch-operating device which consists in a triangularly-shaped trip-lever operatively connected with the switch-tongue and pivoted near the center to turn on a vertical axis to bring alternately one and another of its sides obliquely across a vertical plane extending parallel with the track-rails and through the pivot; a device carried by the car for operating the trip-lever and having a limited lateral movement and normally held in said vertical plane and being vertically movable, the amplitude of lateral movement of said trip-operating device being sufficient to allow said trip-operating device to pass on either side of the pivot of the trip-lever; means being provided for normally holding the trip-operating device yieldingly in said vertical plane; means carried by the car being provided to stop the lateral movement of said trip-operating device to cause the same to turn the trip-lever to throw the switch-tongue; and means for temporarily holding the trip-lever in whichever position it is thrown by the trip-operating device.

2. In a railway-switch-operating apparatus, the combination of a lever which is substantially triangular in form, and which is pivoted between the rails of the main track, and which is provided at the end opposite the switch, with a pin which passes downwardly through a slot formed in a plate with which said lever is pivotally connected, a cord which is secured to said pin, and passes around pulleys mounted between the rails of the track, and connected with the free end of the switch bar or tongue, and springs which operate in connection with said pin, substantially as shown and described.

3. In a railway-switch-operating apparatus, the combination of a lever which is pivoted between the rails of the main track, and which is provided at the end opposite the switch, with a pin which passes downwardly through a slot formed in a plate with which said lever is pivotally connected, a cord secured to said pin, and passed around pulleys mounted between the rails of the track, and connected with the free end of the switch bar or tongue, said lever being adapted to be operated by devices connected with the platform of the car, and said plate being provided with means for limiting the movement of said lever, substantially as shown and described.

In testimony that I claim the foregoing as my invention I have signed my name, in presence of the subscribing witnesses.

RICHARD CADY.

Witnesses:

JAMES R. TOWNSEND,
ALFRED I. TOWNSEND.